Figure 1:
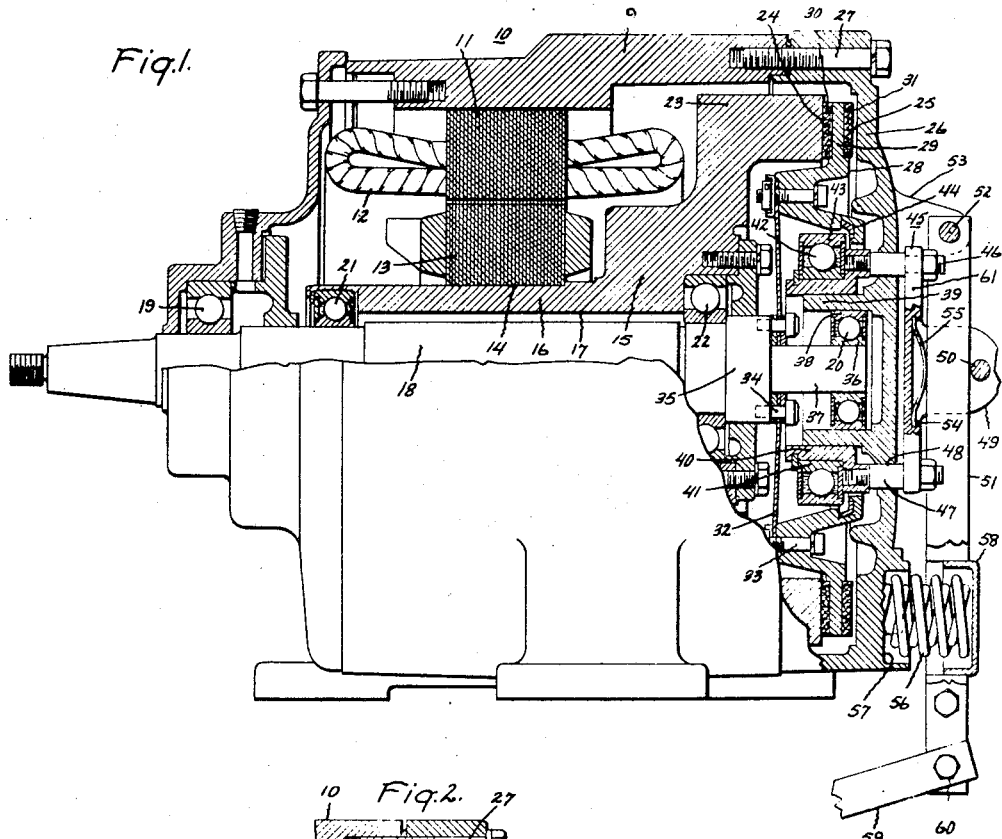

Aug. 7, 1956 W. N. McCROSKEY ET AL 2,757,766
CLUTCH-BRAKE MECHANISM FOR DYNAMOELECTRIC MACHINES
Filed July 25, 1955

Inventors:
Warren N. McCroskey,
Frank J. Mongraw,
by
Their Attorney.

United States Patent Office 2,757,766
Patented Aug. 7, 1956

2,757,766

CLUTCH-BRAKE MECHANISM FOR DYNAMO-ELECTRIC MACHINES

Warren N. McCroskey and Frank J. Mongraw, Fort Wayne, Ind., assignors to General Electric Company, a corporation of New York Application July 25, 1955, Serial No. 524,019

7 Claims. (Cl. 192—18)

This invention relates to clutch-brake mechanisms, and more particularly to clutch-brake mechanisms for use in conjunction with dynamoelectric machinery.

The use of a flywheel in conjunction with an electric driving motor to smooth-out load fluctuations is well-known. Such an arrangement, run continuously with a driven device connected thereto through a clutch or alternatively stopped by a brake, has, in fact, become standard apparatus because it permits a driven device, such as, for instance, a loom, to be stopped and started rapidly and frequently while the motor runs continuously. An improved arrangement of this type is described in Patent 2,646,519—Kalikow, Hildebrand, and Lukens, assigned to the assignee of the present application. In addition, an even more advanced and simplified construction of the type set forth above is described in detail in Patent 2,646,520—Labastie also assigned to the assignee of the present application. However, previous constructions, including those set forth in the patents mentioned above, require that during operation a bearing load be transmitted through at least one, and usually two sliding fits. This has caused pitting and other irregularities to form in the relatively slidable surfaces so that it was no longer possible to be sure of effecting the sliding action with a predetermined force. Since it is imperative that the clutch-brake mechanism operate in response to a predetermined signal from the loom or other driven member, such a defect greatly shortens the life of dynamoelectric machines, which include such a clutch-brake mechanism. In addition, in previous constructions it has been found necessary to effect the sliding fit between two members which both rotate during operation of the machine. While there is generally no relative rotation between the two members, the rotation of the two together involves a considerable amount of vibration and this, in turn, increases the pitting effect mentioned above. In order to prolong the life of dynamoelectric machines having clutch-brake mechanisms, it becomes most desirable to provide a structure wherein the bearing load during operation is transmitted around the sliding fit rather than through it. In addition, it is desirable to avoid continuous contact between two relatively slidable members during operation of the machine. This is particularly important where the two relatively slidable members are in rotation during such operation.

It is, therefore, an object of this invention to provide an improved clutch-brake mechanism for dynamoelectric machines which includes the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In one embodiment thereof, this invention provides a clutch-brake mechanism which includes driving means having an annular substantially radially extending face, and braking means having an annular substantially radially extending face axially spaced from the driving means face. A driven shaft is rotatably mounted coaxially with the faces, and an axially movable annular clutch-brake wheel has a portion disposed between the annular faces selectively to engage one or the other for selectively effecting clutch action or brake action. The clutch-brake wheel is biased against one of the faces, and means are provided to secure the wheel to rotate with the shaft. An antifriction bearing is provided with an inner race mounted in axially movable and non-rotatable relation to the braking means. The bearing also has an outer race which is positioned in spaced relation to the wheel when the wheel is biased against the one face. This outer race is arranged to engage the clutch-brake wheel and force it against the other face upon a predetermined axial movement of the inner race of the bearing.

When the foregoing structure is used, and the face against which the clutch-brake wheel is biased is that of the driving means, the only sliding relationship occurs between the braking means and the inner race of the bearing (or the part on which the inner race is mounted), thus precluding any sliding between rotatable parts. In addition, the outer race of the bearing which forces the wheel against the braking face is entirely out of engagement with the wheel during operation, with the result that no amount of operation can possibly cause deterioration of the relatively engageable surfaces of the outer race and of the clutch-brake wheel.

Figure 2:
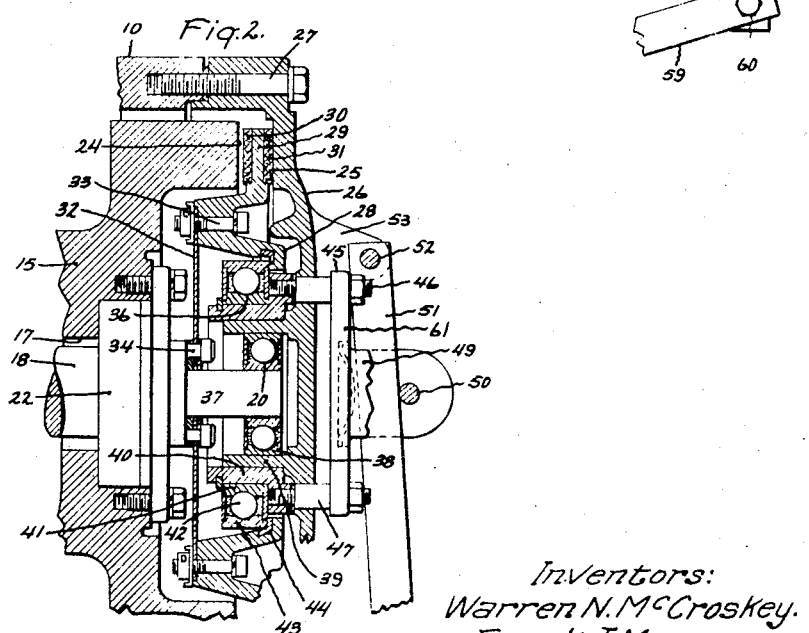

In the drawing,

Figure 1 is a side view, partly cut away and partly in cross section, of a dynamoelectric machine incorporating the improved clutch-brake mechanism of this invention in operating position; and Figure 2 is a fragmentary side view, partly in cross section, of the improved structure of this invention during a braking operation.

Referring now to the figures of the drawing, there is shown an arrangement in which a housing, generally indicated at 10, is adapted to hold a conventional electric induction motor stator core portion 11 made up of a plurality of thin laminations of magnetic material and provided with a stator winding 12. Arranged to react electrodynamically with the stator core portion is a rotor core 13, also formed of a plurality of thin laminations of magnetic material, which is shown as a conventional squirrel cage type rotor except that it is provided with an extra large inner bore 14. The motor is provided with a large flywheel 15 having a portion 16 extending within and secured to the rotor bore 14 so that the flywheel will be driven from the rotor. Flywheel 15 has an inner bore 17 forming a clearance with an inner drive shaft 18 which acts as the output shaft of the entire mechanism. Shaft 18 is journaled within housing 10 by a pair of antifriction bearings 19 and 20, preferably of the sealed type, as shown, and the flywheel 15 is journaled upon the shaft 18 by a pair of bearings 21 and 22. The flywheel 15 has a portion 23 extending outwardly from the rotor core and presenting a radially extending annular face 24 which is axially spaced from the radially extending annular face 25 of a member 26 which has the double function of a braking member and an end shield of housing 10. Member 26 is secured to shell 9 of housing 10 by any well known means, such as, for instance, by a plurality of bolts, such as that shown at 27, which threadedly engage shell 9.

Annular face 24 of flywheel 15 forms a clutch facing, as hereinafter will become more apparent, and stationary face 25 forms a brake facing. An annular clutch-brake wheel 28 has a portion 29 interposed between facings 24 and 25. Portion 29 is provided with two annular bands 30 and 31 of a material, such as cork, which wears well during clutching and braking action. Portion 29 may thus be used selectively to provide braking action between facing 25 and band 31 or clutching action between facing 24 and band 30 depending upon whether clutch-brake wheel 28 is moved in one direction or the other.

An axially yielding compressible circumferentially relatively rigid member, shown in the figures as dished spring washer 32, is held at its outer periphery by a plurality of bolts 33 which secure the washer to clutch-brake wheel 28 and at its inner periphery by a plurality of bolts 34 which secure the dished washer to portion 35 of shaft 18. This particular arrangement is more fully set forth in the aforementioned Labastie patent. Since washer 32 is secured to both shaft 18 and wheel 28, and is circumferentially rigid, it will secure the shaft and the wheel to rotate together, while, at the same time, they are movable axially relative to each other because the washer is formed to be axially yielding. As stated before, shaft 18 is journaled by means of bearing 20; the inner race 36 of bearing 20 is secured about portion 37 of shaft 18 while the outer race 38 is secured within annular flange-like portion 39 of member 26 so that bearing 20 transmits the bearing load between shaft 18 and member 26.

An annular member 40 is mounted with its inner surface in axially slidable relation to the outer surface of flange portion 39. The inner race 41 of a bearing 42 is rigidly secured to annular member 40 and the outer race 43 of the bearing is arranged so as to be slidable into engagement with a bearing surface of a bronze insert 44 in the wheel 28. Bearing 42 may be of the sealed type, as shown, or else any other standard means of maintaining the bearing lubricant away from the clutching and braking surfaces may be used. The bearing surface is preferably disposed in a plane parallel to faces 24 and 25, i. e., radially extending, so that axial movement of member 40 will cause smooth engagement of outer race 43 with the bearing surface. Under normal circumstances, washer member 32 is arranged so as to bias band 30 of wheel 28 into engagement with facing 24 of flywheel 15. However, movement of annular member 40 to the right, as viewed in Figure 1, will bring the side of outer race 43 of bearing 42 into engagement with the surface of insert 44, and further movement of annular member 40 to the right will move the clutch-brake wheel to take band 30 out of engagement with facing 24 and force band 31 into engagement with facing 25 of member 26. It will be observed that, during operation of shaft 18 through the engagement of facing 24 and band 30 of brake wheel 28, the outer race 43 of bearing 42 is out of engagement with the rotating surface of insert 44. In addition, since the bearing load is transmitted between the shaft and member 26 through bearing 20, there is no bearing load to be transmitted between the relatively slidable parts 39 and 40 and consequently the pitting effect which was so deleterious in previous mechanisms of this type is substantially eliminated. The invention has been described with bronze insert 44 having a machined surface being used in conjunction with clutch-brake wheel 28. This is normally the best approach since economics and the desirability of low inertia of the wheel generally result in clutch-brake wheel 28 being cast of aluminum. However, it will be readily understood that the primary purpose is to provide a surface which will cooperate with outer race 43 of bearing 42 without pitting, even for the exceedingly brief span of time that the two surfaces are normally in relatively rotating engagement, and that the surface may be formed in the wheel itself where practicable, or any desired means of providing a bearing surface on the wheel may be utilized.

Member 40 is secured to a yoke member, generally indicated at 45, by threaded members 46 which extend respectively through sleeves 47 slidably mounted in openings 48 in member 26. Yoke member 45 includes a bifurcated portion 49 having a cross pin 50 secured at the ends thereof. A lever member 51 is pivoted at 52 on a protruding portion 53 of member 26, and is arranged to extend within bifurcated portion 49 of yoke member 45 so as to be engageable by pin 50. Cross member 61 of yoke member 45 is provided with a recess 54 which contains a leaf spring member 55 arranged to bear against lever 51 so as to maintain the lever in contact with pin 50. A spring assembly 56 is seated at one end in a recess 57 in member 26 and in the other end in a member 58 rigidly secured to lever 51. A connecting rod 59 may be pivotally secured to lever 51 by a pin 60 so as to provide an operative connection to the device to be driven.

When force is transmitted through rod 59 to lever 51 to cause the lever 51 to move to the right, the lever will bear against pin 50 and, in turn, the entire yoke member 45 will be moved to the right. Since the yoke member is secured to annular member 40 by threaded members 46, the annular member will also be moved to the right carrying with it bearing 42. Outer race 43 of the bearing 42 will then engage insert 44, as best seen in Figure 2, and the clutch-brake wheel will be pulled to the right against the action of washer 32. The engagement of band 31 with braking surface 25 will then rapidly bring the rotation of the clutch-brake wheel to a stop; since output shaft 18 is secured to rotate with wheel 28 through washer 32 the shaft will also cease to rotate. To move wheel 28 out of the braking position and into the operating position, lever 51 is moved to the left. The engagement of leaf spring 55 with one side of the lever will cause the lever to remain in tight engagement against pin 50 so that yoke member 45 will follow the movement of the lever without any play being present. This prevents any chatter of the bearing 42 against wheel 28 by ensuring that the two are maintained in the desired spaced relationship.

Lever 51 may be stopped at an intermediate point where washer 32 will bias wheel 28 against outer race 43 of bearing 42 out of contact with brake face 25, but the bearing prevents contact of wheel 28 with clutch face 24. This arrangement permits manual operation of the driven device when it is desired. The fact that the bearing surface of insert 44 is parallel to faces 24 and 25, as stated above, precludes any wobble of wheel 28 relative to faces 24 and 25 during manual operation.

If the movement of lever 51 to the left is continued, wheel 28 will move, under the bias of washer 32, back into operative engagement with face 24 of flywheel 15. The yoke member 45 will continue to be moved by lever 51 to the position shown in Figure 1 so that outer race 43 of bearing 42 is entirely out of engagement with wheel 28. Since the wheel is again in engagement with flywheel 15, it is rotated thereby, and the rotation is transmitted to shaft 18 through washer 32.

It will be seen from the foregoing that this invention provides an arrangement wherein practically no bearing load is transmitted through the relatively slidable surfaces, and the slidable surfaces are stationary during operation of the motor.

While this invention has been explained by describing a particular embodiment thereof, it will be apparent that improvements and modifications may be made without departing from the scope of the invention as defined in the appended claims.

What we claim as new and desire to secure by Letters Patent of the United States is:

1. A clutch-brake mechanism comprising driving means having an annular substantially radially extending face, braking means having an annular substantially radially extending face axially spaced from said driving means face, a driven shaft rotatably mounted coaxially with said faces, an axially movable annular clutch-brake wheel having a portion disposed between said annular faces selectively to engage one or the other for selectively effecting clutch action or brake action and biased against one of said faces, means for securing said wheel to rotate with said shaft, an antifriction bearing having an inner race mounted in axially movable and non-rotatable relation to said braking means, said bearing further having an outer race normally positioned in spaced relation to said wheel when said wheel is biased against said one face, said outer race being arranged to engage said wheel and force it against the other of said faces upon a predetermined axial movement of said inner race.

2. A clutch-brake mechanism comprising driving means having an annular substantially radially extending face, braking means having an annular substantially radially extending face axially spaced from said driving means face, a driven shaft rotatably mounted coaxially with said faces, an axially movable annular clutch-brake wheel having a portion disposed between said annular faces selectively to engage one or the other for selectively effecting clutch action or brake action and biased against one of said faces, means for securing said wheel to rotate with said shaft, an annular flange extending from said braking means radially within the face of said braking means, an annular member having an inner surface in slidable relation to the outer surface of said annular flange, an antifriction bearing having an inner race rigidly mounted on said annular member, said bearing further having an outer race normally positioned in spaced relation to said wheel when said wheel is biased against said one face, said outer race being arranged to engage said wheel and force it against the other of said faces upon a predetermined movement of said annular member.

3. A clutch-brake mechanism comprising driving means having an annular substantially radially extending face, braking means having an annular substantially radially extending face axially spaced from said driving means face, a driven shaft rotatably mounted coaxially with said faces, an axially movable annular clutch-brake wheel having a portion disposed between said annular faces selectively to engage one or the other for selectively effecting clutch action or brake action, means for securing said wheel to rotate with said shaft and for biasing said wheel against said driving means face, an annular flange extending from said braking means radially within the face of said braking means, an annular member having an inner surface in slidable relation to the outer surface of said annular flange, an antifriction bearing having an inner race rigidly mounted over said annular member, said bearing further having an outer race normally positioned in spaced relation to said wheel when said wheel is biased against said driving means face, said wheel having an insert with a bearing surface arranged parallel to said faces and axially opposite said outer race, said outer race being arranged to engage said insert of said wheel thereby to force said wheel against said braking means face upon a predetermined movement of said annular member.

4. A clutch-brake mechanism comprising driving means having an annular substantially radially extending face, braking means having an annular substantially radially extending face axially spaced from said driving means face, an axially movable annular clutch-brake wheel having a portion disposed between said annular faces selectively to engage one or the other for selectively effecting clutch action or brake action, an axially stationary driven shaft arranged coaxially with said faces, means for securing said brake wheel to rotate with said shaft and for biasing said brake wheel against said driving means face, an annular flange extending from said braking means radially within the face of said braking means, a bearing secured within said annular flange about said shaft so as to mount said shaft rotatably with respect to said braking means, an annular member having an inner surface in slidable relation to the outer surface of said annular flange, an antifriction bearing having an inner race rigidly mounted on said annular member, said antifriction bearing further having an outer race normally positioned in spaced relation to said wheel when said wheel is biased against said driving means face, said outer race being arranged to engage said wheel and force it against said braking means face upon a predetermined movement of said annular member.

5. In a dynamoelectric machine having a housing, a stator core, a rotor core, and a flywheel secured to said rotor core and having a portion extending outwardly therefrom presenting a radially extending annular face axially spaced from a radially extending annular face of said housing, a clutch-brake mechanism having a rotatable output shaft journaled within said housing and within said flywheel, an axially movable annular clutch-brake wheel having a portion disposed between said radially extending annular faces on said flywheel and said housing selectively to engage one or the other selectively effecting clutch action or brake action, said wheel being biased against one of said faces, means for securing said wheel to rotate with said shaft, an annular member positioned in limited axially slidable relationship to said housing, means for moving said slidable member, an antifriction bearing having an inner race rigidly secured to said slidable member, said bearing having an outer race normally positioned in spaced relation to said wheel when said wheel is biased against said one annular face, said outer race being arranged to engage said wheel and force it against the other of said annular faces upon a predetermined movement of said slidable member.

6. In a dynamoelectric machine having a housing, a stator core, a rotor core, and a flywheel secured to said rotor core and having a portion extending outwardly therefrom presenting a radially extending annular face axially spaced from a radially extending annular face of said housing, a clutch-brake mechanism having a rotatable output shaft journaled within said housing and within said flywheel, an axially movable annular clutch-brake wheel having a portion disposed between said radially extending annular faces on said flywheel and said housing selectively to engage one or the other for selectively effecting clutch action or brake action, said wheel being biased against one of said annular faces, means for securing said wheel to rotate with said shaft, an antifriction bearing having an inner race secured in axially movable relation to said housing, means for moving said antifriction bearing relative to said housing, said bearing having an outer race normally in spaced relation to said wheel when said wheel is biased against said one annular face, said outer race being arranged to engage said wheel and force it against the other of said annular faces upon a predetermined movement of said bearing.

7. In a dynamoelectric machine having a housing, a stator core, a rotor core, and a flywheel secured to said rotor core and having a portion extending outwardly therefrom presenting a radially extending annular face axially spaced from a radially extending annular face of said housing, a clutch-brake mechanism having an axially stationary rotatable output shaft journaled with said housing and within said flywheel, an axially movable annular clutch-brake wheel having a portion disposed between said annular faces selectively to engage one or the other for selectively effecting clutch action or brake action means for securing said wheel to rotate with said shaft and for biasing said wheel against said flywheel face, an annular flange extending from said housing radially within said housing face, an annular member having an inner surface in slidable relation to the outer surface of said annular flange, means outside said housing extending through said housing into engagement with said slidable annular member arranged to slide said member relative to said annular flange, an antifriction bearing having an inner race rigidly secured to said slidable annular member, said bearing having an outer race normally in spaced relation to said wheel when said wheel is biased against said flywheel face, said wheel having an insert with a bearing surface axially opposite said outer race, said outer race being arranged to engage said insert of said wheel thereby to force said wheel against said housing face upon a predetermined movement of said annular member.

No references cited.